(12) United States Patent
Hillen et al.

(10) Patent No.: US 10,562,124 B2
(45) Date of Patent: Feb. 18, 2020

(54) WELDING APPARATUS WITH AUTOMATED WELDING RETRACTION

(71) Applicant: LINCOLN GLOBAL, INC., Santa Fe Springs, CA (US)

(72) Inventors: Edward Hillen, Painesville, OH (US); Joseph A. Daniel, Sagamore Hills, OH (US); David Kempert, Willoughby, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 430 days.

(21) Appl. No.: 15/347,747

(22) Filed: Nov. 9, 2016

(65) Prior Publication Data
US 2017/0050258 A1 Feb. 23, 2017

Related U.S. Application Data

(63) Continuation-in-part of application No. 13/760,380, filed on Feb. 6, 2013, now Pat. No. 9,498,839, which
(Continued)

(51) Int. Cl.
*B23K 9/12* (2006.01)

(52) U.S. Cl.
CPC .................... *B23K 9/125* (2013.01)

(58) Field of Classification Search
CPC ...... B23K 9/125; B23K 9/095; B23K 9/1043; B23K 9/1336; B23K 9/295; B23K 9/32; B23K 9/1333
(Continued)

(56) References Cited

U.S. PATENT DOCUMENTS

| 1,840,735 A | 1/1932 | Osborne |
| 2,073,603 A | 3/1937 | Seckman |

(Continued)

FOREIGN PATENT DOCUMENTS

| CN | 2871090 | 2/2007 |
| DE | 3609877 A1 | 9/1987 |

(Continued)

OTHER PUBLICATIONS

International Search Report & Written Opinion for corresponding application PCT/IB2013/00165 dated Apr. 8, 2014.
(Continued)

*Primary Examiner* — Thien S Tran
(74) *Attorney, Agent, or Firm* — David J. Muzilla

(57) ABSTRACT

A method providing a welding apparatus configured to supply a welding wire to a welding gun and a welding system implementing the same is described. The welding gun has a trigger and an opening where the welding wire extends when the trigger is activated. The method also has a computer with a user interface that includes an automatic wire retract program, the program dynamically adjusting the amount of welding wire retraction based at least upon one of the following: welding arc current, welding wire size, welding wire speed and burnback time. The program monitors the welding gun and determines when the trigger is disabled. The program indicates when a first condition is satisfied and retracts the welding wire so the welding wire preferably does not extend (or minimally extends—or may be at least partially recessed within the tip) from the opening of the welding gun nozzle tip. The system and method also includes an ability to stop advancement or retraction of the wire to prevent damage.

20 Claims, 10 Drawing Sheets

Related U.S. Application Data is a continuation-in-part of application No. 13/370,652, filed on Feb. 10, 2012, now abandoned, which is a continuation-in-part of application No. 12/967,667, filed on Dec. 14, 2010, now Pat. No. 9,821,400.

(58) Field of Classification Search
USPC .... 219/121.54, 124.03, 130.01, 130.21, 132, 219/137.71
See application file for complete search history.

(56) References Cited

U.S. PATENT DOCUMENTS

| | | | |
|---|---|---|---|
| 2,163,863 | A | 6/1939 | Biederman |
| 2,498,905 | A | 2/1950 | Abbott |
| 2,628,302 | A | 2/1953 | Tymer |
| 2,731,536 | A | 1/1956 | Laur |
| 3,068,351 | A | 12/1962 | Longenecker |
| 3,141,085 | A | 7/1964 | Manz |
| 3,277,269 | A | 10/1966 | Zeller |
| 3,546,415 | A | 12/1970 | Marantz |
| 3,777,110 | A | 12/1973 | Yohn et al. |
| 4,283,617 | A | 8/1981 | Merrick et al. |
| 4,935,598 | A | 6/1990 | Ward |
| 5,191,185 | A | 3/1993 | John, Jr. et al. |
| 5,275,336 | A | 1/1994 | Stasi et al. |
| 5,332,342 | A | 7/1994 | Kizaki et al. |
| 5,916,464 | A | 6/1999 | Geiger |
| 6,160,241 | A | 12/2000 | Stava |
| 6,720,529 | B2 | 4/2004 | Davidson et al. |
| 6,742,719 | B2 | 6/2004 | Tudor et al. |
| 2004/0016735 | A1* | 1/2004 | Huismann ............ B23K 9/0735 219/137.71 |
| 2005/0127862 | A1 | 6/2005 | Glasgow |
| 2006/0131293 | A1 | 6/2006 | Kaufman |
| 2006/0207979 | A1* | 9/2006 | Daniel ................. B23K 9/095 219/130.01 |
| 2008/0149608 | A1 | 6/2008 | Albrecht |
| 2010/0213181 | A1* | 8/2010 | Hirota ................. B23K 9/0671 219/130.31 |
| 2011/0309061 | A1 | 12/2011 | Rozmarynowski |
| 2012/0160897 | A1* | 6/2012 | Enyedy ................. B21F 23/00 228/8 |
| 2012/0199566 | A1 | 8/2012 | Hillen et al. |
| 2012/0298639 | A1* | 11/2012 | Wang ................... B23K 9/124 219/121.64 |
| 2013/0146575 | A1 | 6/2013 | Hillen et al. |

FOREIGN PATENT DOCUMENTS

| | | | |
|---|---|---|---|
| GB | 749122 | 10/1956 | |
| JP | S51-120327 U | 9/1976 | |
| JP | 59229288 A | * 12/1984 | ............ B23K 9/125 |
| JP | 2000202629 | 7/2000 | |
| JP | 2004-188430 A | 7/2004 | |
| JP | 2007021542 | 2/2007 | |
| JP | 2007260757 | 10/2007 | |
| WO | WO-2009072407 A1 | * 6/2009 | .......... B23K 9/0671 |
| WO | 2011159730 | 12/2011 | |
| WO | 2012080796 A1 | 6/2012 | |
| WO | 2013117987 A2 | 8/2013 | |

OTHER PUBLICATIONS

International Search Report & Written Opinion for corresponding application PCT/IB2013/00165 dated Nov. 21, 2013.
International Search Report & Written Opinion for corresponding application PCT/IB2013/00165 dated Jun. 28, 2013.
The next generation of Automated welding systems and standalone components, http://www.ametinc.com/brochures/AMET_XM%20Brochure.pdf dated Dec. 9, 2010.
Cold wire feeders, CL Worldwide, http://ckworldwide.com/coldwire.htm dated Dec. 9, 2010.
PCT/IB2011/002911 International Search Report.
PCT/IB2011/002911 Written Opinion of International Search Authority.

* cited by examiner

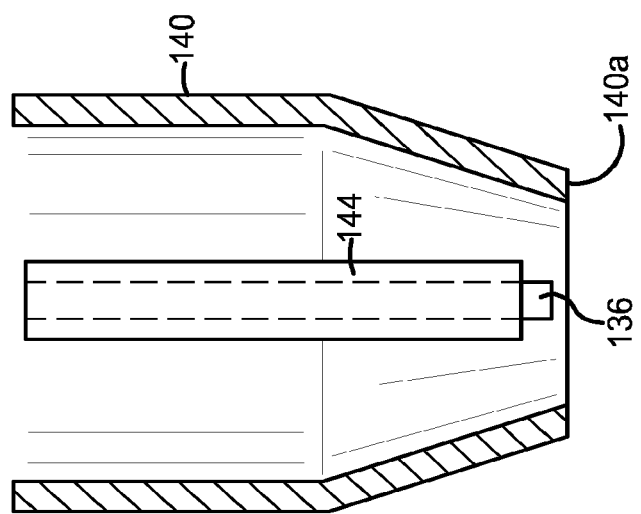
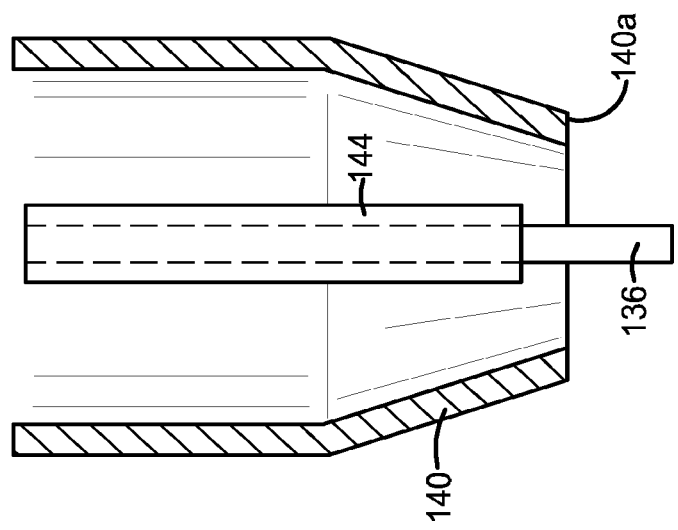
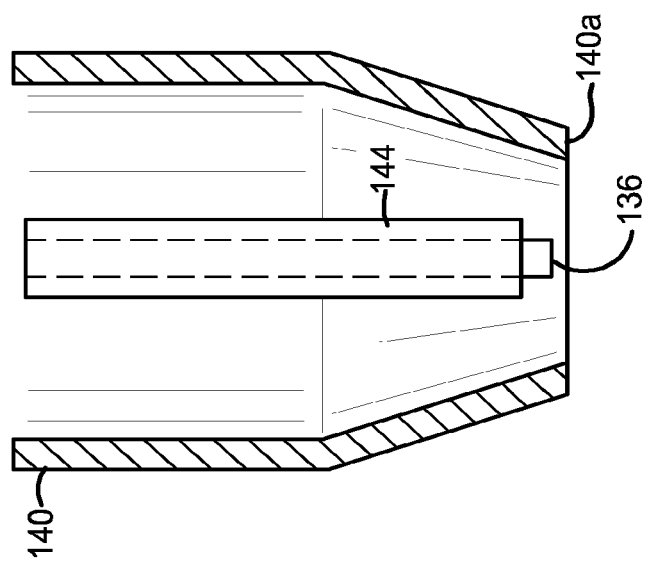

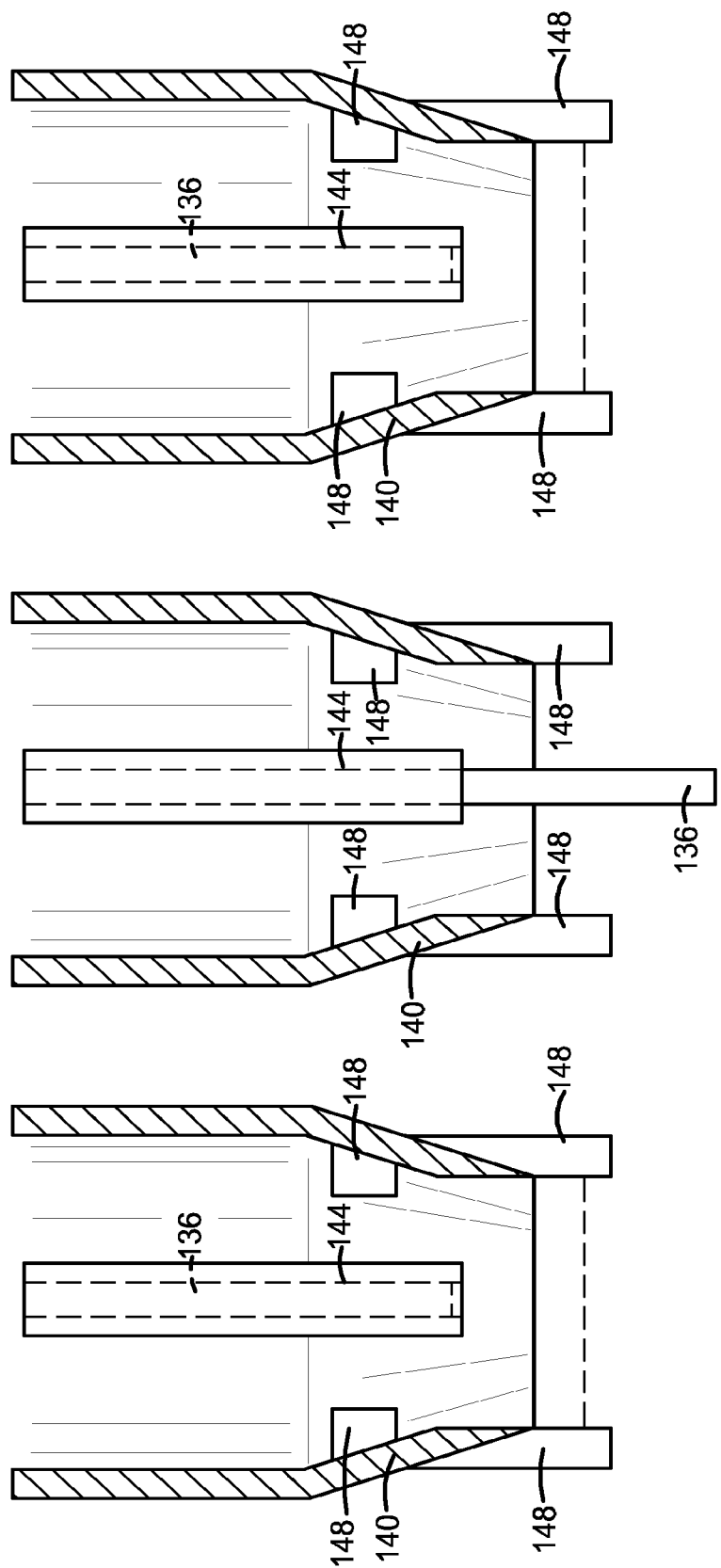

WELDING APPARATUS WITH AUTOMATED WELDING RETRACTION

CROSS-REFERENCE TO RELATED APPLICATIONS

This application is a continuation-in-part of pending patent application Ser. No. 13/760,380 filed Feb. 6, 2013, which is a continuation-in-part of abandoned patent application Ser. No. 13/370,652 filed 10 Feb. 2012, which is a continuation-in-part of pending patent application Ser. No. 12/967,667 filed 14 Dec. 2010, the patent applications are fully incorporated herein by reference, in their entirety.

TECHNICAL FIELD

The invention described herein relates generally to an automated wire retract method for a welding apparatus. Additionally, the invention relates to retrofitting or modifying a welding apparatus to include an automatic wire retract method.

BACKGROUND OF THE DISCLOSURE

Welding apparatus are configured to be operated by welders and other personnel. Often, this welding equipment includes welding wire feeders that advance welding wire to a welding gun when a welder activates a welding gun trigger (e.g., by squeezing the trigger or by depressing a foot pedal). After welding, a pointed end of the welding wire extends from the tip of the welding gun, possibly exposing welders and other personnel to a potentially unsafe condition.

In view of the foregoing problems and shortcomings of existing welding apparatus, the present application describes a system and method to overcome these shortcomings.

SUMMARY OF THE DISCLOSURE

In one aspect of the invention, an automatic wire retract method is described comprising at least the following steps: providing a manual welding apparatus having at least a welding power source, a wire feeder configured to supply a welding wire, and a welding gun having a trigger and an opening from which the welding wire extends; providing an automatic wire retract program having a retract delay time; configuring the manual welding apparatus to include the automatic wire retract program; monitoring when the trigger is enabled to extend the welding wire from the wire feeder to the opening, and extending the welding wire out of the opening of the welding gun; determining a first amount of time when the trigger is disabled; determining when the first amount of time is at least equal to the retract delay time, wherein the trigger is disabled during the first amount of time; and at least partially retracting the welding wire into the opening of the welding gun for a retract distance or a retract time, said step of at least partially retracting dynamically based upon at least one of the following parameters: welding arc current, welding wire size, welding wire speed and burnback time. The first amount of time, i.e., the delay time is a user defined amount of time based typically upon historical operator welding characteristics, and may be unique for each welding operation. The second amount of time, i.e., the retract time is a dynamically adjusted value based upon the characteristics of the welding operation being employed. The amount of retraction is at least a partial retraction from the contact tip to work distance ("CTWD"), and may result, depending on the characteristics of the welding operation and welding gun configuration, in a complete retraction within the gun tip, or essentially coextensive with the welding gun tip, or even partially extending beyond the welding gun tip, but at a distance which is less than the CTWD during the welding operation.

It should be recognized that while the term "trigger" is employed in this patent application, it is intended to include foot pedal operations, in which the activating mechanism is not physically present on the welding gun body.

In another aspect of the invention, a method is described which includes at least the following steps: providing a manual welding apparatus configured to supply a welding wire to a welding gun, wherein the welding gun has a trigger and an opening where the welding wire extends when the trigger is activated; providing a computer with a user interface that includes an automatic wire retract program; monitoring the welding gun; determining when the trigger is in either an enabled or disabled position during said step of monitoring; performing a comparison using the automatic wire retract program to indicate when a first condition is satisfied after determining that said trigger is in a disabled position; and at least partially retracting the welding wire after said comparison, said step of at least partially retracting dynamically based upon at least one of the following parameters: welding arc current, welding wire size, welding wire speed and burnback time.

In still yet another aspect of the invention, a method is described to improve the safety of a welding operation using a welding torch which employs a trigger to advance a welding wire, comprising the steps of: depressing said trigger to advance said welding wire to initiate a welding operation; releasing said trigger to stop said advancement of said welding wire; detecting that said trigger is in a released position; waiting for a first period of time; comparing said first period of time to a predefined waiting time; at least partially retracting said welding wire when said first period of time exceeds said predefined waiting time; and continuing said step of at least partially retracting for a second period of time, said step of continuing said step of at least partially retracting dynamically based upon at least one of the following parameters: welding arc current, welding wire size, welding wire speed and burnback time.

In a further aspect of the invention, a welding system is described which includes at least the following: a welding power source; a wire feeder; a welding gun in operative communication with said wire feeder, said welding gun having a means to control said wire feeder; a wire retract program in operative communication with said wire feeder, said wire retract program comprising: a detection means for determining when said means to control said wire feeder has communicated a signal to said wire feeder to stop feeding said wire; a comparator for measuring elapsed time between said signal to stop feeding said wire and a present time; and said program operatively communicating a signal to said wire feeder to at least partially retract said wire after said comparator determines that said elapsed time has exceeded a preset time, said step of at least partially retracting dynamically based upon at least one of the following parameters: welding arc current, welding wire size, welding wire speed and burnback time.

In a still further aspect of the invention, a welding system is described which includes at least the following: a welding power source; a wire feeder; a welding gun in operative communication with said wire feeder, said welding gun having a means to control said wire feeder; a wire retract program in operative communication with said wire feeder, said wire retract program comprising: a detection means for determining when said means to control said wire feeder has communicated a signal to said wire feeder to stop feeding said wire; and said program operatively communicating a signal to said wire feeder to at least partially retract said wire after said signal to said wire feeder to stop feeding said wire after a predefined a preset time, said step of at least partially retracting dynamically based upon at least one of the following parameters: welding arc current, welding wire size, welding wire speed and burnback time.

While a welding stoppage delay is typically preferred, it is not always essential and the invention encompasses a process of using a welding torch which employs a trigger to advance a welding wire, comprising the steps of: depressing said trigger to advance said welding wire to initiate a welding operation; releasing said trigger to stop said advancement of said welding wire; detecting that said trigger is in a released position; at least partially retracting said welding wire after detecting that said trigger is in a released position; and said step of at least partially retracting dynamically based upon at least one of the following parameters: welding arc current, welding wire size, welding wire feed rate and burnback time.

In combination with the above, a system is described in which A welding system comprising: a welding power source; a wire feeder; a welding gun in operative communication with said wire feeder, said welding gun having a means to control said wire feeder; a wire retract program in operative communication with said wire feeder, said wire retract program comprising: a detection means for determining when said means to control said wire feeder has communicated a signal to said wire feeder to stop feeding said wire; and said program operatively communicating a signal to said wire feeder to at least partially retract said wire after said wire feeder has stopped feeding said wire, said wire retract program retracting dynamically for a distance which approximates an electrode stick out distance based upon at least one of the following parameters: welding arc current, welding wire size, welding wire feed rate and burnback time.

In a further exemplary embodiment of the present invention, the wire feeder motor torque and/or current is monitored to determine if an error or issue exists in withdrawing or advancing the wire. This information is monitored and the control of the wire advancement and/or retract is stopped or controlled based in the detected torque/current to the wire feeder motor.

Also within the scope of the invention is a method of locating a welding apparatus that does not have an automatic wire retract program and providing a means for modifying the welding apparatus so that the automatic wire retract program is enabled.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIGS. 3a-3c are enlarged cross sectional views through the nozzle of FIG. 2;
FIGS. 5a-5c are enlarged cross sectional views of yet another nozzle embodiment.

DETAILED DESCRIPTION OF THE DRAWINGS

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. As used herein, the following terms will have the following meanings The term "contact tip to work distance" or "CTWD" means a distance between the contact tip end e.g., 144a as illustrated in FIG. 9 and the horizontal plane of the workpiece at the weld site.

Figure 9:
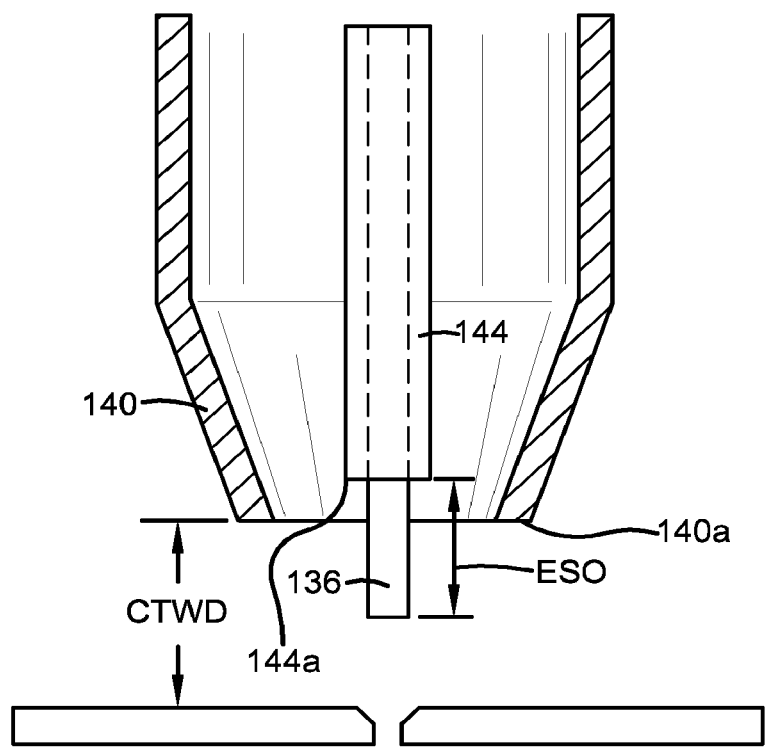
FIG. 9 is an illustration of contact tip to work distance ("CTWD") and electrode stick out ("ESO")

The term "electrode stick out" or "ESO" means a distance between the contact tip end, e.g., 144a and the terminal tip of the electrode 136 as illustrated in FIG. 9.

The term "proximate" means a measurement deviation from the horizontal plane of the nozzle end or contact tip end of no more than about 0.125 inches.

Figure 1:
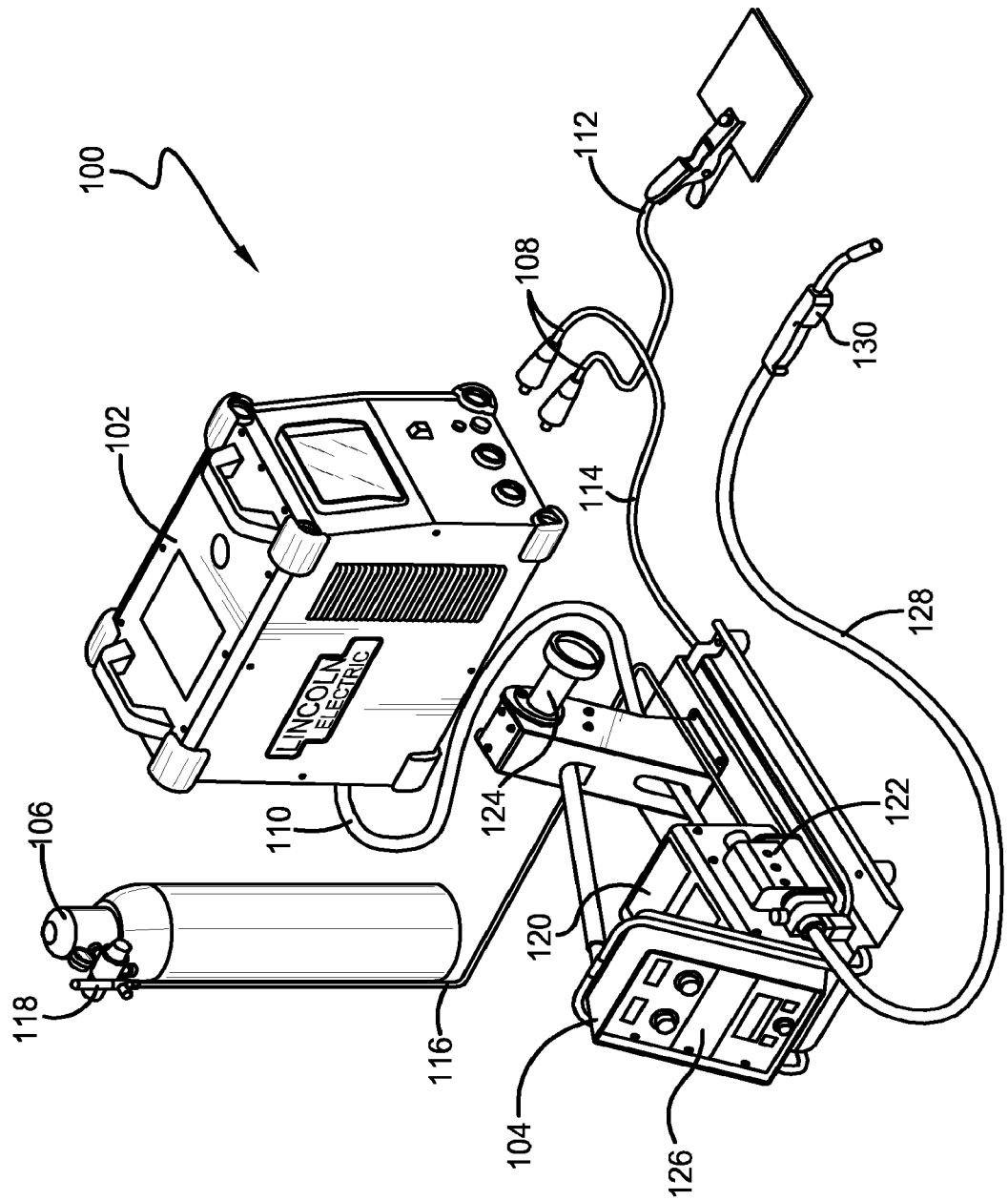
FIG. 1 is a perspective view of a welding apparatus.

Referring now to the drawings wherein the showings are for purposes of illustrating the preferred embodiment of the invention only and not for purposes of limiting the same, as illustrated in FIG. 1, welding apparatus 100 includes welding power source 102, wire feeder 104, and gas supply 106. Welding power source 102 includes power cables 108, control cable 110, and power supply cable (not shown). Power cables 108 include a ground wire and clamp 112 connected to a work piece and power cable 114 configured to connect to wire feeder 104. Control cable 110 may be configured to connect to wire feeder 104. In another embodiment (not shown), control cable 110 may be configured to be wireless. It is understood that welding power source 102, power cables 108, and control cable 110 can have any configuration suitable for supplying power and welding controls to the welding apparatus 100.

Further illustrated in FIG. 1, gas conduit 116 and regulator 118 are configured to connect gas supply 106 to wire feeder 104. Gas supply 106 may include inert gases, active gases, or a combination of both, including but not limited to argon, helium, carbon dioxide, argon and helium, argon and hydrogen, and other gas combinations. In another embodiment (not shown), welding apparatus 100 uses welding wire that is coated with a material that forms a gas shield when burned, therefore, a gas supply may not be necessary in all embodiments. It is understood that the gas supply may be any gas or combination of gases configured to shield a weld from the atmosphere.

As shown in FIG. 1, wire feeder 104 may include housing 120, gear box 122, wire spool assembly 124, and user interface 126. Extending from gear box 122 is hose 128 that is configured to connect to welding gun 130. Housing 120 may be connected to user interface 126 and gear box 122. Further, control cable 110 and power cable 114 extending from welding power source 102 and gas conduit 116 extending from gas supply 106 are configured to connect to housing 120, gear box 122, and hose 128. Gear box 122 includes at least a plurality of rollers (not shown) that advance and retract the welding wire (not shown) and a wire guide (not shown) that controls the path of the welding wire. It is understood that wire feeder 104 may have any configuration suitable for receiving a gas supply, a power supply, and welding controls.

Extending between gear box 122 and welding gun 130 is hose 128 which operatively connects the welding wire and wire conduit, a gas line (if required), and a welding gun trigger switch connection. In another embodiment (not shown), as discussed above, hose 128 does not include a gas line. In yet another embodiment (not shown), hose 128 may include a control cable configured to connect welding gun 130 to at least one of the following: welding power source 102, wire feeder 104, and gas supply 106. Hose 128 can be any diameter and length configured to contain the welding wire, the gas hose, and the switch connection. Hose 128 is made of any material suitable for welding environments. It is understood that hose 128 and welding gun 130 may have any configuration suitable for supplying welding wire, welding gas, and controls through the hose and to the welding gun.

In the illustrated embodiment of welding apparatus 100, user interface 126 includes at least one of the following: a control system, a computer (or optionally at least a CPU) with sufficient processing capabilities to implement and/or run a software program and a setup program. For example, user interface 126 on welding apparatus 100 includes an automatic wire retract program configured to reverse gear box 122 on wire feeder 104 so exposed welding wire (not shown) at least partially retracts from an opening or an end of the welding gun. The automatic wire retract program is designed to prevent a welder from being exposed to a potentially sharp end of the welding wire that may stick out or extend beyond the opening or the end of welding gun 130. The automatic wire retract program can be password protected so that supervisors and other management personnel can maintain control of the automatic wire retract program.

In one initial embodiment of the invention described in the parent application, the automatic wire retract program compared a time delay between a welder discontinuing use of welding apparatus 100 for more than a preset first amount of time and upon either meeting and/or exceeding the preset delay time, the automatic wire retract program at least partially retracted the welding wire from the opening or the end of the welding gun for a second amount of time (reversal time). For example, user interface 126 included a first setting where a retract delay time was set and a second setting where a wire retract time was set. After these settings were made, if a welder discontinues use of the apparatus for an amount of time greater than or equal to the specified first amount of time, the wire feeder retracted the welding wire for the second amount of time (or equivalently distance as illustrated below).

In another initial embodiment of the invention described in the parent application, the automatic wire retract program was configured to retract the welding wire from the opening or the end of the welding gun for a predetermined and fixed distance when a welder discontinued use of the welding apparatus 100 for more than the first amount of delay time. For example, user interface 126 included a first setting where the retract delay time was set and a second setting where the retract distance was set.

In yet another initial embodiment of the invention described in the parent application, upon a welder discontinuing use of welding apparatus 100 for more than the first amount of time, the automatic wire retract program was configured to at least partially retract the welding wire from the opening or the end of the welding gun until a sensor system (not shown) indicated that the end of the welding wire is in a safe zone (not shown) within welding gun 130. For example, automatic wire retract program retracted the welding wire until the sensor was activated, wherein the sensor indicates that the end of the welding wire is contained within the nozzle, the tip (not shown), or both the nozzle and tip. Automatic wire retract methods for welding apparatuses will be further discussed below. It is understood that the user interface and the automatic wire retract program may be configured in any way so that the end of the welding wire in a welding apparatus at least partially retracts into a portion of the welding gun, e.g., a tip and a nozzle, so a welder is not exposed to a potentially sharp welding wire.

Figure 2:
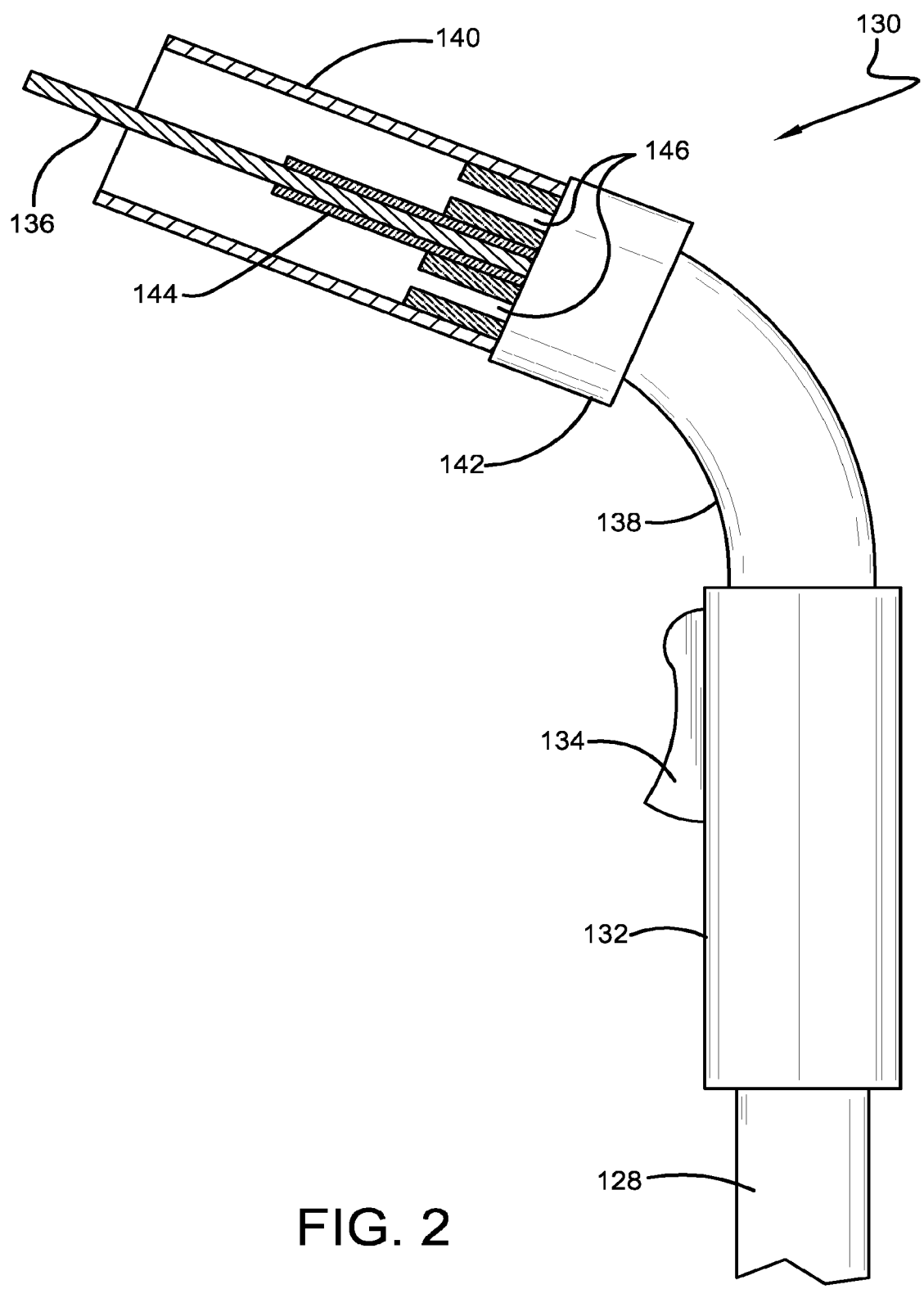
FIG. 2 is a side view of a welding gun of FIG. 1.

As shown in FIG. 2, hose 128 is configured to connect to welding gun 130 in proximity to welding gun handle 132. Trigger 134 on handle 132 is configured to advance welding wire 136 from the gear box of the wire feeder (not shown) through hose 128 and handle 132, and further along neck 138 and nozzle 140. Nozzle 140 is configured to removably attach to neck 138. In addition, trigger 134 may be configured to control welding shielding gas. For example, welding wire 136 extends from nozzle 140 and welding shielding gas surrounds welding wire when a welder actuates trigger 134 (i.e., moves the trigger from a default inactive position typically with the trigger fully extended to an activated position typically with the trigger fully, or at least partially, depressed). In another embodiment (not shown), neck 138 may have a longer or shorter length and may bend at a different angle than what is shown in FIG. 2. It is understood that welding gun 130 may have any configuration suitable for a welder to control the advancement of the welding wire and the supply of the welding shielding gas.

As illustrated in FIG. 2 nozzle 140 include insulating boss 142 in one embodiment, that is configured to prevent heat and electrical contact from transferring from nozzle 140 to at least one of the following: neck 138 and welding gun handle 132. Inside nozzle 140, tip 144 is configured to removably attach to neck 138. Tip 144 is further configured to guide welding wire 136 along a center of nozzle 140 and to allow welding gas to emit from gas passages 146 to shield welding wire 136 from the surrounding environment. In another embodiment (not shown), the welding gun includes handle 132, trigger 134, neck 138, tip 144, and gas passages 146. In this configuration, welding gun 130 does not include nozzle 140. It is understood that nozzle 140 may have any configuration suitable for a welder to control the welding wire and the supply of a welding shielding gas.

FIGS. 3a-3c are enlarged cross-sectional views of nozzle 140 of FIG. 2 where tip 144 is configured to be within end 140a of nozzle 140. The series of FIGS. 3a-3c illustrate an example of how welding apparatus 100 is configured to operate when using the automatic wire retract program. For purposes of this example, FIG. 3a shows a cross-section of the nozzle 140 for an initial welding condition before a welder uses the welding apparatus 100. FIG. 3a shows nozzle 140 having welding wire 136 extending from tip 144, wherein welding wire 136 and tip 144 are completely within end 140a of nozzle 140. FIG. 3b shows a nozzle cross-section after a welder uses welding apparatus 100. As shown in FIG. 3b, welding wire 136 extends beyond end 140a of nozzle 140, potentially exposing the welder to an end of the welding wire 136. By enabling the automatic wire retract program through the user interface 126, welding apparatus 100 is configured to automatically retract the end of welding wire 136 within end 140a of nozzle 140 when a welder stops welding for a specified amount of time, as illustrated in FIG. 3c. For example, if a welder stops welding for 20 seconds, the automatic wire retract program would retract the welding wire so it is not exposed to the welder. In another embodiment (not shown), the nozzle and tip can be longer or shorter than what is illustrated in FIGS. 3a-3c. It is understood that welding apparatus 100 may be configured with the automatic wire retract program so that the welding wire retracts at least within end 140a of the nozzle 140 when a welder stops welding for a specified amount of time. The times mentioned above are for illustrative purposes only and both larger and shorter periods of time are within the scope of this invention. While a complete retraction of welding wire 136 is illustrated, the invention encompasses embodiments when the welding wire is only partially retracted from its extended state illustrated in FIG. 3b. In this aspect of the invention, the welding wire may still extend beyond end 140a, but not as far as illustrated in FIG. 3b.

Figure 4A:
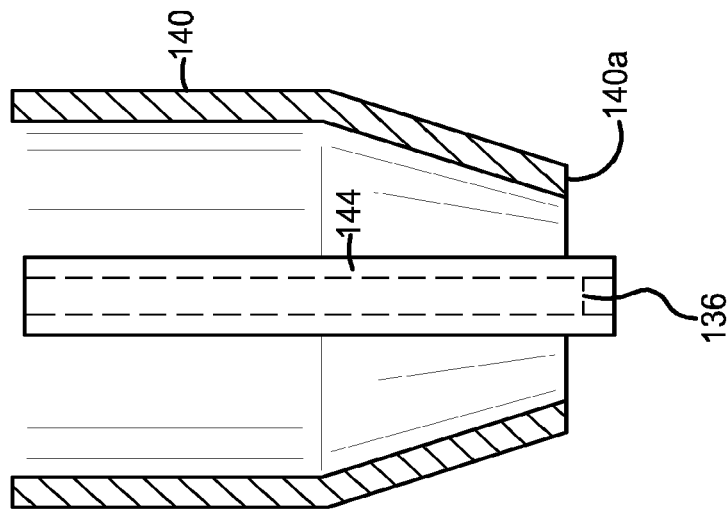
FIGS. 4a-4c are enlarged cross sectional views of another nozzle embodiment.
Figure 4B:
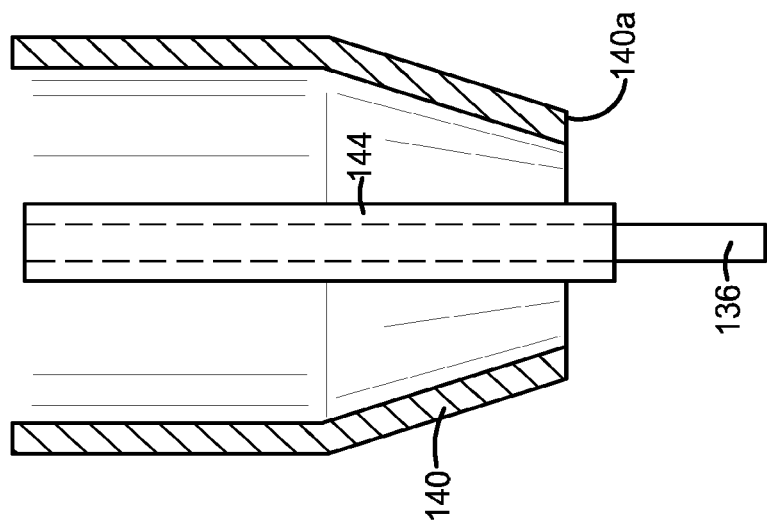
Figure 4C:
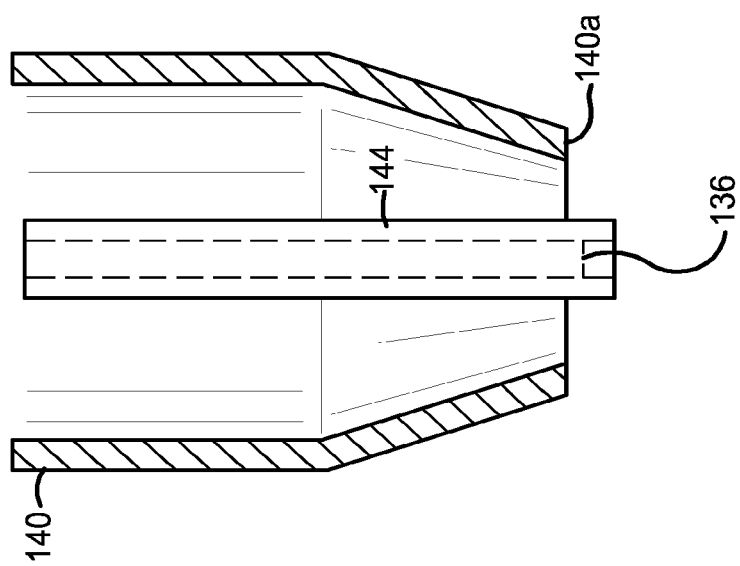

FIGS. 4a-4c are enlarged cross-sectional views of nozzle 140 of FIG. 2 where tip 144 is configured to extend past end 140a of nozzle 140. Similar to the series of FIGS. 3a-3c above, the series of FIGS. 4a-4c illustrate an example of how welding apparatus 100 is configured to operate when using the automatic wire retract program. Again, for purposes of this example, FIG. 4a shows a cross section of nozzle 140 for an initial welding condition before a welder uses welding apparatus 100. FIG. 4a shows nozzle 140 and tip 144, wherein welding wire is not extending from tip 144 and tip 144 extends past end 140a of nozzle 140. FIG. 4b shows a nozzle cross-section after a welder uses welding apparatus 100. As shown in FIG. 4b, welding wire 136 extends from the end of tip 144, potentially exposing the welder to an end of welding wire 136. By enabling the automatic wire retract program through user interface 126, welding apparatus 100 is configured to automatically retract the end of welding wire 136 within the end of tip 144 when a welder stops welding for a specified amount of time, as illustrated in FIG. 4c. In another embodiment (not shown), the tip can be longer or shorter than what is illustrated in FIGS. 4a-4c. In a manner consistent with the description associated with FIGS. 3a-3c, total retraction of welding wire 136 is not required, but at least a partial retraction from the depiction illustrated in FIG. 4b is.

FIGS. 5a-5c are enlarged cross-sectional views of another embodiment of nozzle 140 of FIG. 2 where tip 144 is configured to be within end 140a of nozzle 140. Further, the nozzle includes at least one sensor 148 configured to indicate location of welding wire 136. The at least one sensor can include at least one of the following proximity sensors: mechanical, electrical, optical, laser, ultrasonic, and the like. The series of FIGS. 5a-5c illustrate an example of how welding apparatus 100 is configured to operate when using the automatic wire retract program with at least one sensor. FIG. 5a shows a cross section of nozzle 140 for an initial welding condition before a welder uses welding apparatus 100. FIG. 5a shows nozzle 140 and tip 144, wherein welding wire is not extending from tip 144 and the at least one sensor 148 does not sense welding wire 136. FIG. 5b shows a nozzle cross-section after a welder uses welding apparatus 100. As shown in FIG. 5b, welding wire 136 extends beyond the end of nozzle 140 and tip 144, potentially exposing the welder to an end of welding wire 136. By enabling the automatic wire retract program through user interface 126, welding apparatus 100 is configured to automatically retract the end of welding wire 136 within end 140a of nozzle 140 when a welder stops welding. The welding wire will retract until the welding wire activates the at least one sensor 148 indicating that the end of the welding wire is within nozzle 140 or within tip 144, as illustrated in FIG. 5c. In another embodiment (not shown), the tip can be longer or shorter than what is illustrated in FIGS. 5a-5c. In yet another embodiment (not shown), the number of sensors 148 can be a number less than or greater than the number illustrated in FIGS. 5a-5c. Consistent with the discussions associated with the previous figures, total retraction is not required, but at least a partial retraction from the fully extended position illustrated in FIG. 5b is an aspect of the invention.

Figure 6C:
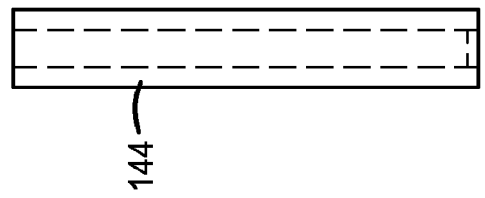
FIGS. 6a-6c are side views of a tip of an alternative welding gun.
Figure 6B:
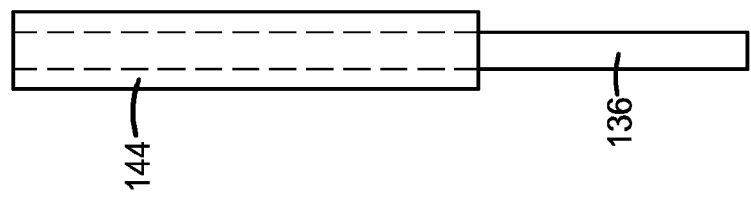
Figure 6A:
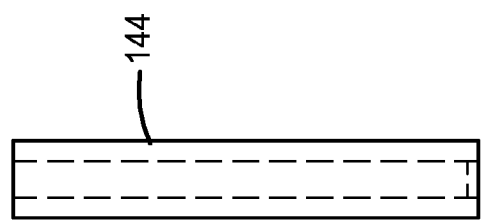

FIGS. 6a-6c are side views of tip 144 of an alternative welding gun where welding gun (not shown) does not include a nozzle so the entire tip 144 is exposed. The series of FIGS. 6a-6c illustrate an example of how welding apparatus 100 is configured to operate when using the automatic wire retract program. FIG. 6a shows a side view of tip 144 for an initial welding condition before a welder uses welding apparatus 100. FIG. 6a shows where the welding wire is not extending from exposed tip 144. FIG. 6b shows the side view of tip 144 after a welder uses welding apparatus 100. As shown in FIG. 6b, welding wire 136 extends from the end of tip 144, potentially exposing the welder to an end of welding wire 136. By enabling the automatic wire retract program through user interface 126, welding apparatus 100 is configured to automatically retract the end of welding wire 136 within the end of tip 144 when a welder stops welding for a specified amount of time, as illustrated in FIG. 6c. In another embodiment (not shown), the tip can be longer or shorter than what is illustrated in FIGS. 6a-6c consistent with previous discussions.

Figure 7:
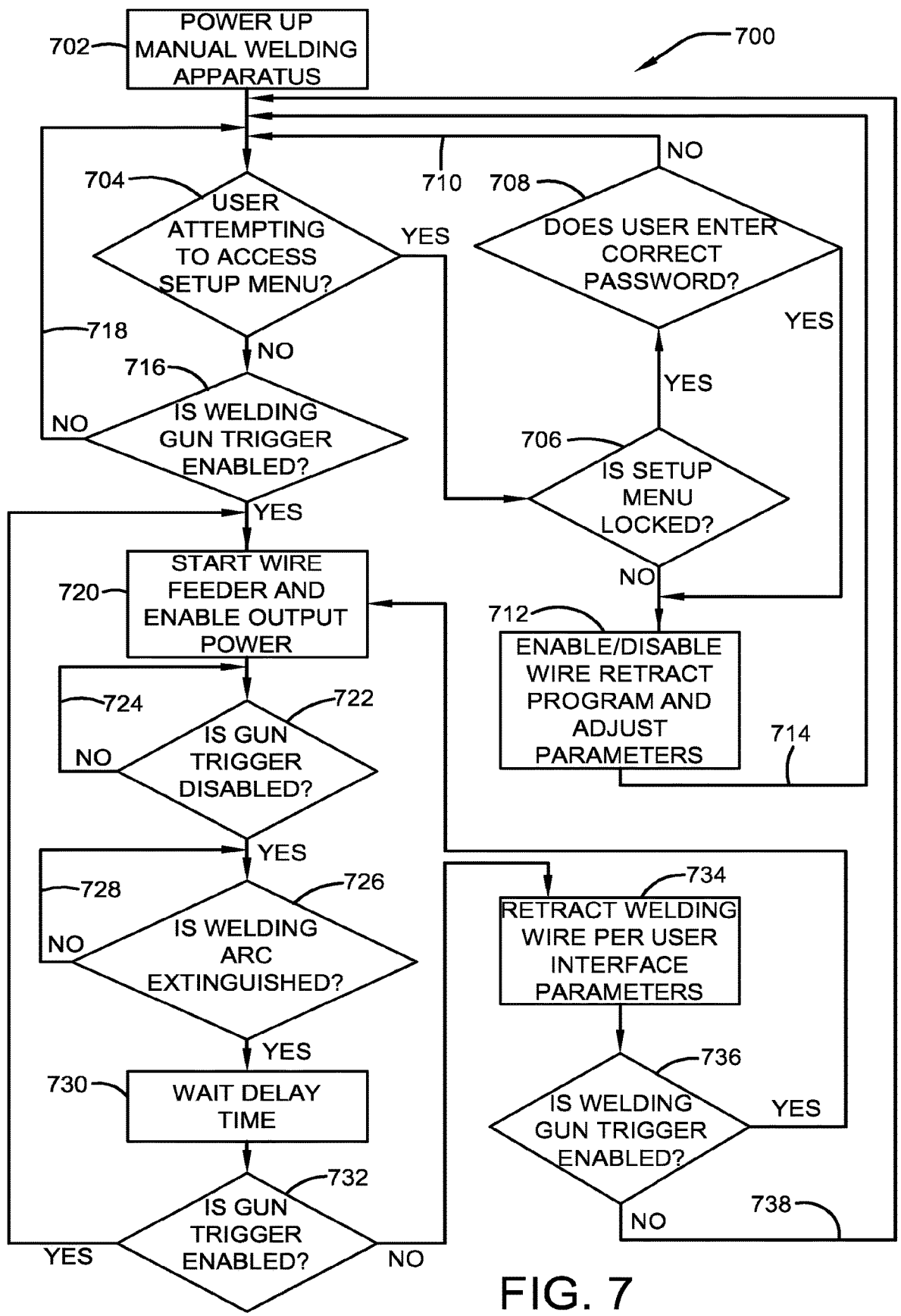
FIG. 7 is a flow chart illustrating one embodiment of an automatic wire retract method.

FIG. 7 is a flow chart illustrating one embodiment of an automatic wire retract method 700 for welding apparatus 100. As shown in FIG. 7, welding apparatus is configured to power up at 702. At 704, a computer having an automatic wire retract program determines whether a user is attempting to access the setup menu through the user interface or computer. If the user is attempting to access the setup menu at 704, the computer determines if the setup menu is locked at optional 706. If the setup menu is locked at optional 706, the computer determines if the user enters the correct password at 708. If the setup menu is locked and the user does not enter the correct password, the computer blocks access to the setup parameters and returns the user to a previous user interface option at 710. If the setup menu is locked and the user does enter the correct password, the computer allows the user access to the setup parameters to enable or disable the automatic wire retract program at 712. After the user enables or disables the automatic wire retract program and any related parameters, the computer returns the user to a previous user interface option at 714. For example, the user may adjust at least one of the following parameters, including: a retract delay time, a retract time, a retract distance, and proximity sensor parameters.

If the user is not attempting to access the setup menu at 704, the computer determines if the welding gun trigger is enabled at 716. If the welding gun trigger is not enabled and the welding apparatus has power, the computer waits until the welding gun trigger is enabled or the user attempts to access the setup menu at 718. If the welding gun trigger is enabled at 716, the wire feeder starts and the welding power source supplies power at 720. At 722, the computer determines if the welding gun trigger is disabled. If the welding gun trigger is not disabled, the computer monitors the welding gun trigger at 724. When the welding gun trigger is disabled at 722, the computer determines if the welding arc is extinguished at 726. If the welding arc is not extinguished at 726, the computer monitors the welding arc at 728.

When the welding arc is extinguished at 726, the computer tracks a wait time delay and determines if the wait time delay is greater than a retract delay time set in the user interface at 730. For example, the retract delay time can be any time greater than zero. If the wait time delay is less than the retract delay time set in the user interface, the computer continues to monitor the wait time delay. If the wait time delay is at least equal to the retract delay time set in the user interface, the computer checks to see that the welding gun trigger is enabled at 732. If the welding gun trigger is enabled at 732, the wire feeder starts and the welding power source supplies power at 720. If the welding gun trigger is not enabled at 732 and the wait time delay is at least equal to the retract delay time set in the user interface, the automatic wire retract program retracts the welding wire based on user interface parameters at 734. For example, the welding wire may retract for an amount of time or a specific distance. At 736, the computer determines if the welding gun trigger is enabled. If the welding gun trigger is enabled at 736, the wire feeder starts and the welding power source supplies power at 720. If the welding gun trigger is not enabled at 736, at 738 the computer returns to the beginning of the method at 704. It is important to note that it is possible to activate trigger during the retract delay time which would restart the welding operation, as if welding gun trigger is employed at 732. It is not necessary to wait for the full retract delay period before restarting welding.

In another embodiment of the method, the computer monitors the gear box drive motor on the wire feeder for excess current or torque, wherein the excess current or torque may indicate a problem with the automatic wire retract method. In any case, it must be understood that welding apparatus 100 using automatic wire retract method 700 may be configured so that the welding wire retracts at least within end 140a of nozzle 140 or tip 144 when a welder stops welding for a specified amount of time.

As explained above, in an exemplary embodiment the computer can monitor the gear box drive motor in the wire feeder for excess torque or current, and thus excess torque and/or current can indicate an issue with the retraction of the wire. For example, there can be a bend or defect in the wire which would cause the wire to jam in the torch contact tip and inhibit/prevent retraction. This is detected because the drive motor will attempt to maintain the set wire feed speed for retraction/advancement and because of the impediment the motor torque will rise and the current draw on the motor will rise indicating an issue. If the drive motor (e.g., located within the housing 120) is allowed to continue to operate even if an issue is detected, this could result in damaging the wire—which would compromise any future attempted welding operation. Therefore, it is desirable to prevent this damage before it occurs. The use of motors in wire feeders is well known and need not be described in detail herein. Further, the design, configuration and use of current and/or torque sensing or detection circuits are equally well known and need not be described herein. Typically the detection circuits are coupled to the motor that is used to drive the wire feeding wheels and these detection circuits can detect the current usage of the motor to determine the forces on the wire being fed. Further, in some systems the current can be used to determine the torque in the motor, which again equates to the resistive forces acting on the wire during feeding. Of course other detection methods and systems for current and/or torque can be used in the wire feeders described herein without departing from the spirit and scope of present invention. Typically, these components are enclosed in the wire feeder and coupled to the controller/cpu of the wire feeder such that the signals/feedback from these detection circuits/systems are sent to the controller to be used in controlling the operation of the wire feeding system as described herein.

In exemplary embodiments of the present invention computer/controller (not shown) that is coupled to the user interface 126 monitors the torque and/or current of the drive motor and if the detected current and/or torque exceeds a threshold value then the computer determines that an issue exists and the drive motor is turned off, so as to prevent damage to the wire. The threshold value of the torque and/or current is selected such that a motor stoppage is not prematurely triggered as torque/current generally fluctuates during driving/retraction of the wire, but if an anomaly exists the motor is stopped before the wire is damaged or compromised. In some embodiments, the computer can use a motor current draw as the threshold value, while in other embodiments a detected torque value of the motor can be used. In further embodiments a combination of torque and current can be used as threshold determiners. In even further exemplary embodiments, a rate of change of the torque and/or current can be used. That is, the computer will monitor the rate of change of the current and/or torque and if the rate of change exceeds a determined threshold amount the motor operation will be stopped.

In exemplary embodiments the threshold value (which is used to trigger motor stoppage) is determined based on user inputs. For example, at the user input 126 the user can provide information such as wire feed speed, wire diameter, and wire type (e.g., material). This information is used by the controller to determine a threshold value (e.g., current, torque, rate of current change and/or rate of torque change) which, when exceeded, will cause the computer to turn off the drive motor during operation. In exemplary embodiments, the threshold value is in the range of 10 to 30% higher than the corresponding value for normal operation. For example, if the drive current for a given welding operation is 10 amps, the cut-off threshold value could be in the range of 11 to 13 amps. In other exemplary embodiments, the threshold value is in the range of 15 to 25% of the normal operation value. Thus, in an exemplary operation, the computer can utilize predetermined normal operation values based on user input information (e.g., WFS, wire diameter, wire type) and then determined each of a normal operation value and a cut-off threshold value. It is noted that this can be done for each of a wire advancement and retract operation. Of course, it should be understood that the torque and current are typically less during a wire retract operation as the WFS for the retraction is often slower (e.g., 50 in/min) then for a welding operation (e.g., as high as 400 in/min). Thus, in many applications the threshold value for wire advancement will be a different value then for wire retraction. In some exemplary embodiments, the respective values are the same % above the normal values. However, in other embodiments, it may be desirable to utilize a different % differential for the threshold value for wire advancement versus retraction. For example, in some applications for wire advancement the threshold value may be a higher % above normal then for wire retraction, while in other embodiments the reverse may be true. For example, during a wire advancement process the threshold is in the range of 10 to 15% higher than the normal current/torque value, while in retraction the threshold is in the range of 20 to 30%. This can be used to reflect the different scales of the values typically in advancement (higher currents, etc.) than in retraction.

In the embodiments, discussed above the normal current and/or torque values can be determined based on user input data, and the use of look-up tables, etc. in the computer. However, in some applications this may not be optimal as the specific user configuration of the welding system may not reflect the data in the look up tables, etc. For example, the distances between the wire feeder and the welding operation can be quite long, thus creating a need for higher torques/currents for proper operation. In such embodiments, the computer can use empirical operational data to determine each of the normal operational values, from which the threshold values are determined. In such embodiments, the computer utilizes user input data (see above) and detected operational data (e.g., torque/current) to determine the normal operational values. For example, in such embodiments, the computer can determine that for a given set of input parameters (e.g., WFS, wire diameter and wire type) an average current of 15 amps is used by the motor for normal operation. Thus, for the same given inputs the computer utilizes the 15 amps as the normal operation point to determine the threshold value. However, for another operation, which may use a faster wire feed speed, the average current is 16.5 amps, and thus for those operations the 16.5 amps is used as the normal operational parameter. Thus, in such embodiments, the computer records and uses historical/empirical operational data that tracks the actual operational parameters of a given welding operation. Such empirical modeling methods are known and need not be described in detail herein. Not only is this empirical methodology used for advancing the wire but also in retract operations. For example, for a given wire size, type and retract speed (which in some embodiments can be user adjusted) the empirical evaluation will determine a normal value and the threshold value is determined based on that determined normal value.

In the embodiments described above, the threshold value is determined based on the normal or average (or expected) value of current and/or torque for a given operation. For example, the threshold is some % higher than the normal value. In some embodiments, the user can adjust the threshold % via the user interface 126. That is, in some embodiments, the % differential for the threshold value is set by the manufacturer, but can be adjusted based on a user preference.

Additionally, in some exemplary embodiments the user interface 126 of the wire feeder can provide a visual indication that a wire feeding/retract error has occurred. As discussed herein, it is desirable in some applications to have the wire retract within the gas nozzle of the torch for safety. In such applications a warning can be visually displayed to indicate that a full retraction has not occurred. That is, in such embodiments a visual indication or warning light, or even audio sounds, can be used to indicate that a full retraction has not occurred and a sharp wire is protruding from the contact tip. The display can display either a textual or pictographic warning, or both. Similarly, a warning can be displayed if advancement has been impaired or stopped. In some embodiments, the operation of the wire feeder can be locked out until a user indicates that the issue has been cleared—that is requiring a specific user input to acknowledge that the issue has been resolved. While this indication can be provided on the user interface 126, it can also be shown on the torch 130 via an LED, or other type of visual indication that a wire feeding error has occurred.

In further exemplary embodiments the user input 126 can display a warning indicating that a given wire feeding operation is outside of the normal operational boundaries, while not yet at the cut-off threshold value. For example, in some scenarios the hose 128 could bent at an awkward angle, or a wire feed liner within the hose 128 could have worn such that feeding is being compromised. In such embodiments, a warning or other visual indication is displayed indicating that operation is not normal, but operation is not stopped. In some exemplary embodiments, this warning can be displayed when the detected torque/current is in the range of 5 to 15% higher than the determined normal operational parameter. Thus, when such an indication is made the user can check the operation of the system before a more serious event occurs.

Similarly, in some exemplary embodiments the computer can use the empirical operation data to determine when system components such as the liner and/or rollers in the gear box 122 need to be replaced. A number of components in this system, including the wire feeding rollers and the wire liner in the hose 128 tend to wear during use. Based on recorded operational/usage data the wire feeder (via the interface 126) can indicate a level of wear and/or whether or not the components are due for replacement. The user can then replace components prior to the creation of operational errors. The indication of wear can be based on manufacturer installed/provided operational limits, or can be, again, based on empirical recorded operations. For example, the user interface 126 can allow for a user to indicate each time a wire guide or wire liner or roller is replaced, and using this indication, along with usage in between replacements the computer can empirically provide wear indication data based on historic actual usage. In some embodiments, the user interface can display wear data. For example, the display can show that any respective component is at 50% of its life, etc.

In yet a further exemplary embodiment of the present invention, the welding system to intentionally create a wire block at the end of the welding wire after a welding operation, to ensure proper sensing of the end of the wire. As generally known, contact tip to work distance can be important to a given welding operation, and thus being able to start a welding operation at the appropriate length quickly is desirable. Embodiments of the present invention accomplish this by creating a consistent wire stop point during retraction so that the tip of the wire is always identified. To do this, in exemplary embodiments the power supply 102 outputs a current at the end of the welding operation to create a deformity, such as a ball, at the end of the welding wire. For example, with reference to FIG. 3b, instead of the welding wire being straight at the end of the welding operation, the current is controlled such that a ball (for example, created by creating a droplet that does not transfer to the puddle) is created and exists at the end of the wire 136. Then, as the wire 136 is retracted the ball/deformity makes contact with the tip 144 such that the wire cannot be further retracted. This contact is detected using methodologies like those described above (e.g., torque/current) and the wire movement is stopped. Once, stopped the computer in the wire feeder knows that the end of the wire is at the tip and then when a subsequent welding operation is started the computer can control the feeder to provide the proper stick out automatically, without a user having to jog the wire or spend time advancing and then cutting the wire. The ball/deformity need not be excessively large, which may interfere with the starting of a subsequent welding operation. For example, in some exemplary embodiments, the deformity can have an average diameter (recognizing that it may not be circular) in the range of 1.1 to 1.5 the diameter of the base wire 136. Various current control techniques can be used to create the ball/deformity, and such techniques will depend on the welding waveform being used for the welding operation, e.g., STT, pulse, etc.

In yet another embodiment (not shown) of an automatic wire retract method 700 for welding apparatus 100, method 700 includes at least one of the following method steps. If a welding gun trigger is enabled, a wire feeder starts and a welding power source supplies power. A computer is configured to determine if the welding gun trigger is disabled. If the welding gun trigger is not disabled, the computer monitors the welding gun trigger. Alternatively, when the welding gun trigger is disabled, the computer determines if a welding arc is extinguished. If the welding arc is not extinguished, the computer monitors the welding arc. Once the welding arc is extinguished, the computer is configured to track a wait time delay and determine if the wait time delay is greater than a retract delay time set in the user interface. If the wait time delay is less than the retract delay time set in the user interface, the computer continues to count the wait time delay. If the wait time delay is at least equal to the retract delay time set in the user interface, the computer checks to see that the welding gun trigger is enabled. If the welding gun trigger is enabled, the wire feeder starts and the welding power source supplies power. If the welding gun trigger is not enabled and the wait time delay is at least equal to the retract delay time set in the user interface, the automatic wire retract program retracts the welding wire. Similar comments are applicable regarding the ability to restart the welding process during the retract delay time period.

Figure 8:
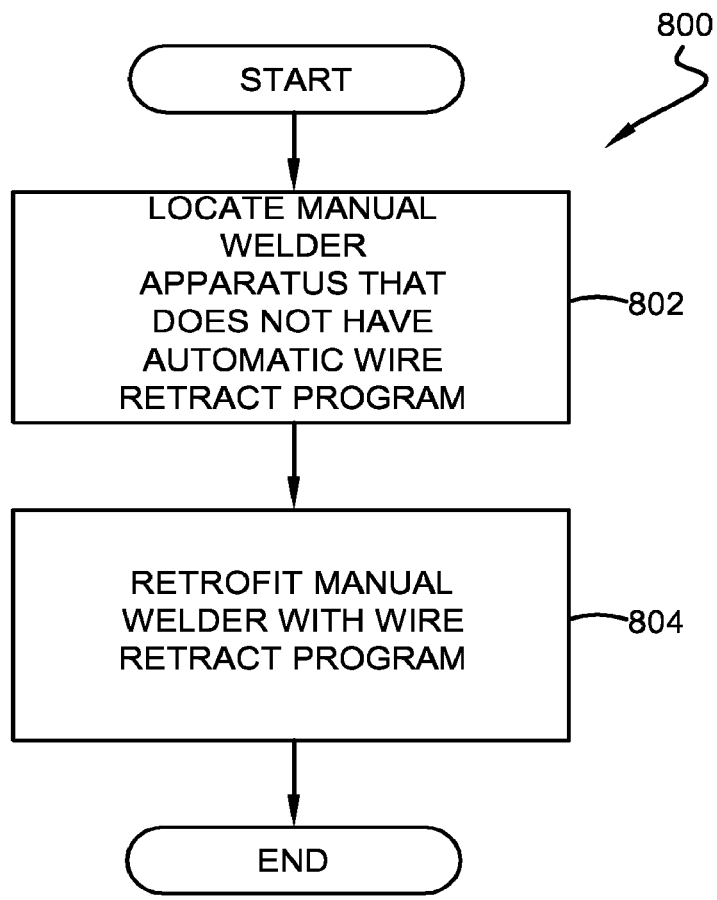
FIG. 8 is a flow chart illustrating a method for modifying a welding apparatus.

FIG. 8 is a flow chart illustrating one embodiment of an automatic wire retract method for a retrofit or modification of a welding apparatus. As shown in FIG. 8, a welding apparatus is located that does not have an automatic wire retract program at 802. At 804, a welding apparatus that has once been manufactured or sold is retrofit or modified with an automatic wire retract program. For example, at least one of the following is added to or modified in the welding apparatus, including: a software program, hardware, a relay, a printed circuit board, a wire harness, a user interface, and the like.

A computer or user interface 126 that may include a computer having an automatic wire retract program illustrates one possible hardware configuration to support the systems and methods described herein, including the methods 700 and 800 above. In order to provide additional context for various aspects of the present invention, the following discussion is intended to provide a brief, general description of a suitable computing environment in which the various aspects of the present invention may be implemented. Those skilled in the art will recognize that the invention also may be implemented in combination with other program modules and/or as a combination of hardware and software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

User interface 126 associated with the automatic wire retract program can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within the computer, such as during start-up, is stored in the ROM.

The computer or the user interface 126 that may include a computer having an automatic wire retract program can further include a hard disk drive, a magnetic disk drive, e.g., to read from or write to a removable disk, and an optical disk drive, e.g., for reading a CD-ROM disk or to read from or write to other optical media. The computer or the user interface 126 that may include a computer having an automatic wire retract program can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the user interface 126.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program data. The operating system in the computer or the user interface 126 can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display can be employed with user interface 126 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from the user interface 126 via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

As discussed hereinabove, the retract time or distance is fixed based upon user input typically through user interface 126 to the software retract program. However, while this represents an advance over the prior art, a dynamic retract time (or dynamic retract distance) based on wire size and/or wire speed and/or average current offers a superior solution. As with the previous solution, the retract time and/or distance does not require the welding wire tip to be fully retracted, but only to retract at least some distance from its fully extended distance upon cessation of a welding operation.

Figure 10:
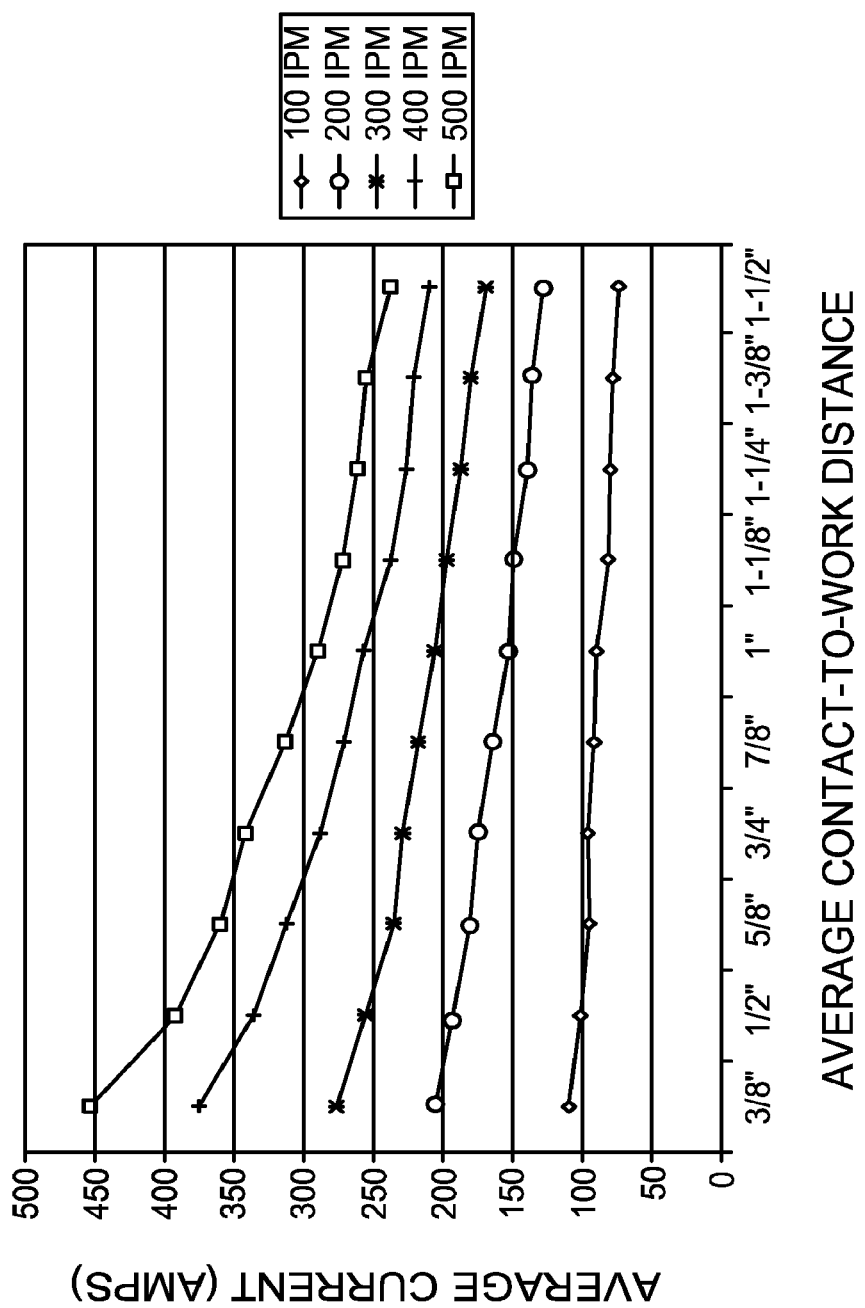
FIG. 10 is a graphical depiction of the relationship between wire feed speed (WFS—inches per minute), contact tip to work distance ("CTWD") and welding current.

As illustrated in FIG. 10, fixed retract times and/or fixed retract distances do not adapt to changing contact-to-work distance variations. The dynamic solution, which takes into account at least one of the following, namely, arc current, wire size, wire speed, burnback time and/or process tip to determine the amount of wire that is protruding from the opening of the welding gun, (or combinations of at least the above parameters) offer advantages not achievable with a static solution. Regardless of the wire stickout position (ESO) when the welding operation stops, the wire preferably retracts to the point where it is positioned either proximate the welding gun tip or between the tip and the nozzle. If the wire retracts too far, the next weld may be delayed until a proper contact-to-work distance is achieved. If the wire does not retract far enough, the wire will protrude from the gun assembly for a distance which may not achieve all of the safety aspects of this invention. FIG. 10 further illustrates the interactivity between welding current, and contact-to-work distance for a given diameter welding wire at various wire feed rates. This relationship can be defined for any combination of variables, accounting for the impact of welding material differences. The retraction amount can employ either a mathematical equation based on the curves represented by FIG. 10, or by interpolating from data table values or combinations thereof.

Further using FIG. 10 as an illustrative non-limiting example, a user welding at an average welding current of 200 amps and using a welding wire feed rate of 300 in/min, would have the software automatically determine that the contact-to-work distance on average would be approximately 1.125" assuming proper welding procedures were being employed. Therefore, a retraction distance of between approximately 1-1.125 inches would be appropriate for the retraction distance, an electrode stick out of approximately 0.125 inches not being sufficient to penetrate a welder's apparel after completion of a welding operation and any subsequent contact with a welding tip.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A welding system comprising:
   a welding power source; and
   a wire feeder having a controller, a wire feeding motor and a motor parameter detector, said wire feeder configured to advance a wire during a first operation mode and retract said wire during a second operation mode,
   wherein said motor parameter detector detects a first motor parameter during said advancement of said wire and compares said first motor parameter to a first threshold value for said first motor parameter and said motor parameter detector detects a second motor parameter during said retraction of said wire and compares said second motor parameter to a second threshold value for said second motor parameter,
   wherein said controller stops advancement of said wire when said first motor parameter exceeds said first threshold value and stops retraction of said wire when said second motor parameter exceeds said second threshold value, and
   wherein said second motor parameter is one of a motor current, a motor current rate of change, or a motor torque rate of change.

2. The system of claim 1, wherein said first motor parameter is one of a motor current, a motor torque, a motor current rate of change, or a motor torque rate of change.

3. The system of claim 1, wherein each of said first and second said threshold value is determined based on a wire feed speed, a diameter of said wire and a type of said wire.

4. The system of claim 1, wherein said first threshold value is larger than said second threshold value.

5. The system of claim 1, wherein said first threshold value is in a range of 10 to 30% larger than a normal value for said first motor parameter during said advancement of said wire.

6. The system of claim 1, wherein said first threshold value is in a range of 15 to 25% larger than a normal value for said first motor parameter during said advancement of said wire.

7. The system of claim 6, wherein said normal value for said first motor parameter is determined based on empirical wire advancement data.

8. The system of claim 6, wherein said normal value for said first motor parameter is determined based on empirical wire advancement data and user input data, which includes at least one of wire diameter, wire type and wire feed speed for said advancement of said wire.

9. The system of claim 1, wherein said wire feeder comprises a user interface which displays a visual indication when either said first threshold value is exceeded by said first motor parameter or said second threshold value is exceeded by said second motor parameter.

10. The system of claim 1, wherein said wire feeder comprises a user interface which displays a visual indication when said first motor parameter exceeds a warning threshold value, where said warning threshold value is below said first threshold value, and wherein said wire advancement is not stopped when said first motor parameter exceeds said warning threshold value.

11. A welding method comprising:
providing a welding power source;
providing a wire feeder having a controller, a wire feeding motor and a motor parameter detector;
advancing a wire with said wire feeder during a first operation mode and retracting said wire during a second operation mode;
detecting a first motor parameter during said advancement of said wire and comparing said first motor parameter to a first threshold value for said first motor parameter;
detecting a second motor parameter during said retraction of said wire and comparing said second motor parameter to a second threshold value for said second motor parameter; and
stopping said advancement of said wire when said first motor parameter exceeds said first threshold value and stopping said retraction of said wire when said second motor parameter exceeds said second threshold value,
wherein said second motor parameter is one of a motor current, a motor current rate of change, or a motor torque rate of change.

12. The method of claim 11, wherein said first motor parameter is one of a motor current, a motor torque, a motor current rate of change, or a motor torque rate of change.

13. The method of claim 11, wherein each of said first and second said threshold value is determined based on a wire feed speed, a diameter of said wire and a type of said wire.

14. The method of claim 11, wherein said first threshold value is larger than said second threshold value.

15. The method of claim 11, wherein said first threshold value is in a range of 10 to 30% larger than a normal value for said first motor parameter during said advancement of said wire.

16. The method of claim 11, wherein said first threshold value is in a range of 15 to 25% larger than a normal value for said first motor parameter during said advancement of said wire.

17. The method of claim 16, wherein said normal value for said first motor parameter is determined based on empirical wire advancement data.

18. The method of claim 16, wherein said normal value for said first motor parameter is determined based on empirical wire advancement data and user input data, which includes at least one of wire diameter, wire type and wire feed speed for said advancement of said wire.

19. The method of claim 11, further comprising displaying a visual indication when either said first threshold value is exceeded by said first motor parameter or said second threshold value is exceeded by said second motor parameter.

20. The method of claim 11, further comprising displaying a visual indication when said first motor parameter exceeds a warning threshold value, where said warning threshold value is below said first threshold value, and wherein said wire advancement is not stopped when said first motor parameter exceeds said warning threshold value.

* * * * *